April 16, 1963 W. A. BEDFORD, JR 3,085,658
VIBRATION DAMPER
Filed Feb. 16, 1961
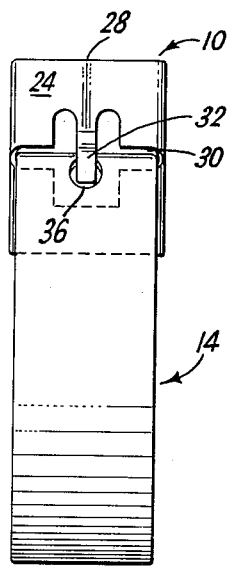
FIG. 1
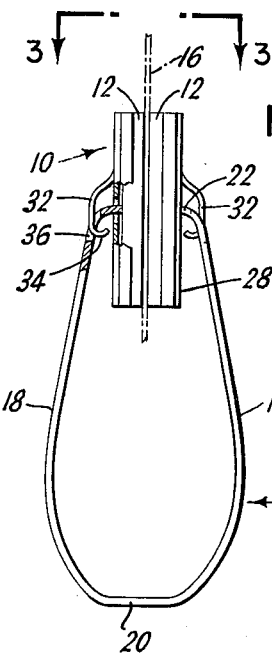
FIG. 2
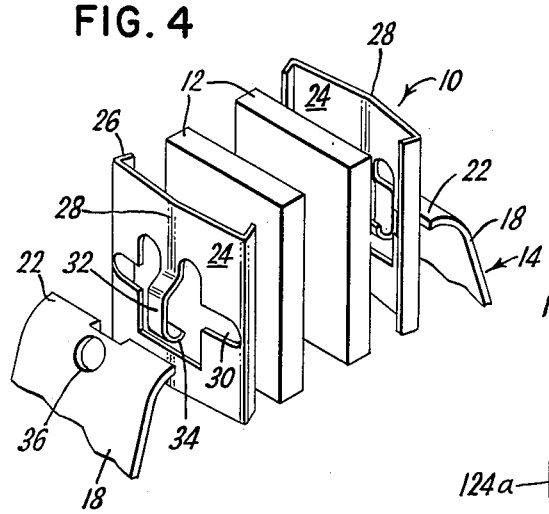
FIG. 4
FIG. 3
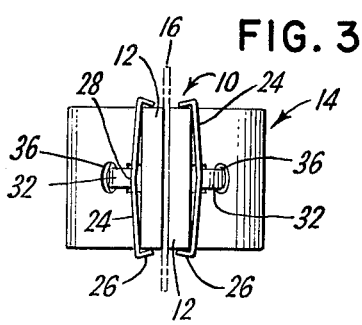
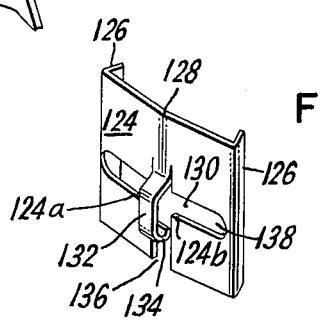
FIG. 5
INVENTOR
WILLIAM A. BEDFORD JR.
BY
ATTORNEY 3,085,658
VIBRATION DAMPER
William A. Bedford, Jr., Littleton, Colo., assignor, by mesne assignments, to Thompson Bremer & Company, Chicago, Ill., a corporation of Delaware
Filed Feb. 16, 1961, Ser. No. 89,772
3 Claims. (Cl. 188—1)

This invention relates to fastening devices and particularly to a clip for attaching a friction pad to a vibration damping unit.

The fastener of the present invention has particular use in units employed to restrain the excessive movement of rotating, oscillating or reciprocating elements of devices, such as the ordinary washing machine, to dampen vibration and decrease the noise level while simultaneously permitting such elements to have a free and floating action. Damping units of the above type operate generally by clamping a pair of friction pads about a fin or plate extending from the vibrating machine element, the pads being secured between the arms of a split highly tensioned spring yoke bracket mounted to the outer frame or housing of the machine or to a grounding base. It will be appreciated that while the pads must be clamped about the moving machine element and that while the yoke is secured to a grounding base, each must be allowed some degree of freedom to move or pivot relative to one another and to the base so that the machine will function properly. In washing machines particularly, the moving tub must always maintain a free floating action even though excessive vibration is restrained.

To hold the pad to the clamping bracket, a clip is employed to secure the pad to the yoke bracket so that the pad will be permitted to follow the movement of the machine while simultaneously maintaining a relatively stable position with respect to the machine and the yoke bracket. The clip functions to avoid any possibility that the pad might shift or become dislodged during the violent movement of the machine. Still another purpose that the clip serves is to secure the pad to the bracket so that in the event the machine element is removed (i.e. for repair) the pad will not be lost. It will be appreciated that to replace such pad on an assembled bracket hidden within an assembled machine, would be quite difficult.

While suitable clips have been developed and are presently in common use, they have been structurally complex and difficult to manufacture and relatively costly in view of their function. One of the reasons the devices presently used are expensive and complex is the fact that it is now necessary to rivet the friction pad and clip together in order that they might act in unison. It is therefore the object of the present invention to provide a clip which is simple and inexpensive to make, to which the pad can easily be secured without riveting or using other adhesive means, thus making it quite easy to use.

Other and more detailed objects will become apparent from the following description and the accompanying drawings, of which:

FIG. 1 is a side elevation view of a damping unit showing the clip of the present invention mounted on the supporting yoke bracket, FIG. 2 is a side elevational view of the damping unit of FIG. 1, partially broken away and showing the fin or plate element in clamped position, FIG. 3 is a top plan view taken along line 3—3 of FIG. 2, FIG. 4 is an exploded view of the damping unit, FIG. 5 is a view of a modified form of clip.

Referring to the drawing, there is illustrated a clip device 10 which is adapted for assembly into a damping unit of the type described, comprising a pair of friction pads 12 made of any suitable material, such as "brake lining" or the like, and a yoke bracket 14. In FIGS. 2 and 3, the unit is seen clamped about a fin or protruding plate 16 of a movable machine element which is not shown.

The yoke 14 is formed of a flat piece of substantially uniform rectangular metal material bent to provide a pair of elongated legs 18 and a base portion 20 which is adapted to be pivotally mounted to the frame or housing of the machine (not shown). The usual method of mounting the bracket is by encasing the base portion 20 within an enlarged rubber block secured to the base or frame of the machine. Of course other mountings may be employed. To accommodate the pads 12, the end portions of the legs 18 are bent still further to form a pair of inwardly directed and opposed pad engaging ends 22 which abut the pads 12 and in such a manner as to tension the legs 18 to simultaneously provide a highly forceful clamping action on the pads. Ordinarily to dampen vibration, the legs are so tensioned that they can be separated only with the use of a mechanical tool specifically designed for that purpose.

Each clip 10 is formed of a rectangular piece of sheet metal or similar material, having a body portion 24 and a pair of side flanges 26, assuming in cross section a substantially U channel shape. The side flanges 26 are bent inwardly beyond the 90° point so that they will impinge on the corresponding side portions of pads 12 when assembled. The body portion 24 is transversely bowed or bent to form a crown ridge 28 running lengthwise of the fastener piece 10. The formation of the bow in a plane substantially perpendicular to the side flanges as provided by the crown ridge 28 provides means for resiliently expanding the dimension between the flanges 26 respectively and creates a degree of spring action in the clip 10 so as to permit it to be easily snapped over the pad 12. In assembly, the flanges 26 will thus be forced to bear against the respective sides of the pad 12, and provide for the maximum retention of the pad 12 to the fastener 10. It will be obvious that with this construction no riveting or adhesion of the pad to the clip is required at all.

Another advantage to the construction above described is that in the manufacturing process, strict adherence to exacting tolerances need not be observed since the spring action of the clip and the in-turned flanges 26 may vary over a moderate range (as can the size of the pad 12) while still functioning to retain the pad 12 in an optimum manner.

To permit the yoke 14 to exert its force directly on the pad 12, the body portion of the clip 10 is formed with a slot 30 within which the engaging ends 22 of the yoke flange seat. The slot 30 is of sufficient width and length to ordinarily prevent any metal to metal contact between the clip and the engaging ends of the yoke flange 26. It is important, however, that the slot 30 be of sufficient length in order to control the lateral motion of the clip and pad. Generally, the length of the slot 30 need not be less than the width of the body portion 24 since the side flanges 26 are of sufficient depth to prevent the engaging end of the flange 22 from sliding over the ends of the slot 30.

To retain the clip and pad assembly on the yoke bracket 14, when the unit is not in operation, an extending finger 32 integrally formed from the body portion 24 is provided. Finger 32 has an inwardly turned hook end 34 which is adapted to enter a hole 36 formed in the yoke bracket 14 and is so constructed that at no time during the operation of the unit does the finger 32 contact any part of yoke bracket 14. This prevents wear and eventual failure of the finger 32 and avoids any unpleasant clicking or snapping sound were the finger 32 to contact the edges of the hole 36. Nevertheless, when the legs 18 of the yoke bracket are separated, the hook member 34 engages the edges of the hole 36 and is retained therein as the clip 10 falls preventing its separation from the yoke bracket 14 and its possible loss.

From the preceding description, it will be quite clear that the damping unit may be easily assembled simply by positioning the clip above the surface of the pad and then with a slight downward pressure on the crown ridge snap the two together, then taking a pair of assembled clips and pads and hooking the fingers over the ends of the yoke brackets.

Thus the units are fully assembled, easily transported and simply attached to any machine. The clip itself is simply constructed preferably stamped out of sheet metal material and bent in a single operation.

FIG. 5 shows a modified form of clip 110 comprising a body portion 124 and a pair of side flanges 126 both fashioned and functioning in a similar manner to the corresponding body portion 24 and side flanges 26 of the other figures. This clip is crowned or bowed at 128. The body portion 124 is cut centrally thereof forming a slot 136 through its entire lower half and enlarged shoulders 124a and 124b. Unlike the preferred form of the invention, the body portion 24 is provided with slot 130 formed only large enough to conveniently receive the engaging end of the suitable yoke bracket. In certain applications, for example, where turning and twisting is encountered, it may be preferable to form the slot 130 in this manner so as to provide retaining edges 138 of considerable surface to retain the ends of the yoke bracket. The body portion 124 is also provided with a hook member 132 whose end 134 lies between the two lower parts 124a and 124b of the body portion 124. Because of the size of shoulders 124a and 124b, the hook is less likely to twist or turn out of engagement with the retaining hole of the bracket on which it is mounted. This figure is shown to indicate that various changes may be made in the form, construction and arrangement of parts herein without departing from the spirit and scope of the invention and without sacrificing any of its advantages, it is to be understood that all matter herein is to be interpreted as illustrative and not in a limiting sense.

I claim:

1. In a damping unit combining a pair of friction pads secured between the ends of a split spring yoke bracket, clips retaining said pads for pivotal engagement with said bracket, each clip comprising a rectangular body having a pair of side flanges for engaging one of said pads, said body being curved to form a crown running parallel to said side flanges to effect resilient engagement of said pad and having a slot running substantially transverse of said crown for the reception of an end of said bracket for engagement directly with said pad, whereby said pad may pivot freely while retained within said clip.

2. The device as defined in claim 1 wherein the slot extends substantially across the entire width of the body.

3. The device as defined in claim 1 wherein the bracket is formed with a hole and the body is formed with a hook member extending outwardly into said hole whereby under compression of the device the hook makes no contact with said bracket but under relaxed condition engages with the bracket and hooks thereto.

References Cited in the file of this patent

UNITED STATES PATENTS

| | | |
|---|---|---|
| 733,945 | Connolly | July 21, 1903 |
| 2,578,381 | Tinnerman | Dec. 11, 1951 |
| 2,647,591 | Young | Aug. 4, 1953 |
| 2,692,681 | Douglas | Oct. 26, 1954 |